Aug. 8, 1939.   B. O'BRIEN   2,168,681
METHOD AND APPARATUS FOR SEPARATING MATERIALS
Filed Jan. 12, 1935   6 Sheets-Sheet 3
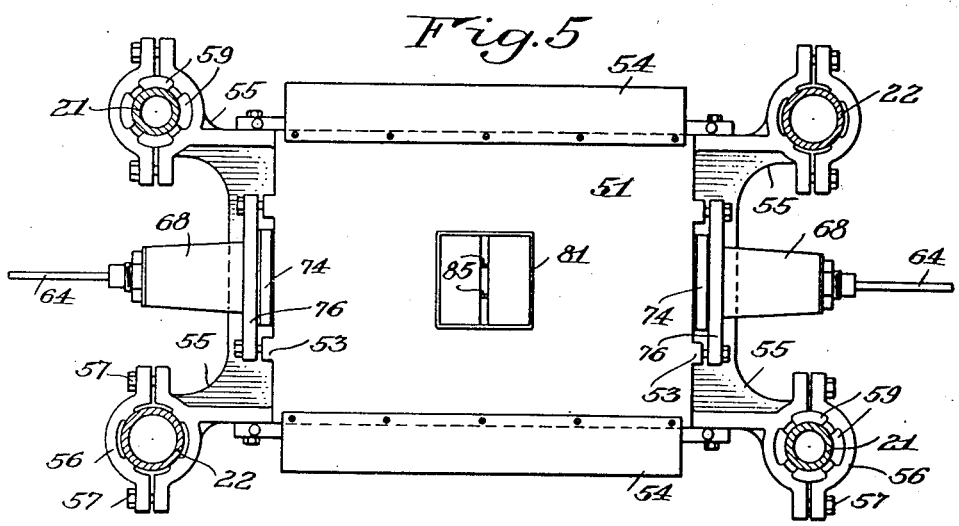
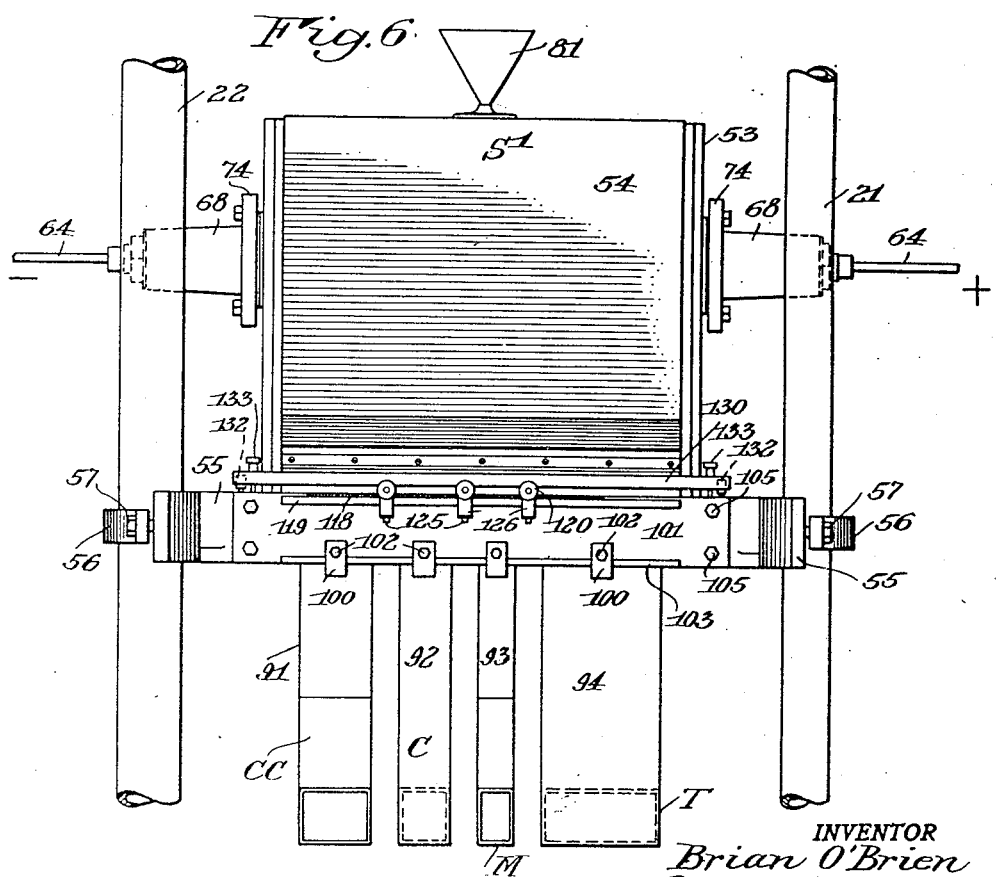
INVENTOR
Brian O'Brien
BY Edward H. Cumpston
his ATTORNEY Aug. 8, 1939.                    B. O'BRIEN                        2,168,681
                   METHOD AND APPARATUS FOR SEPARATING MATERIALS
                       Filed Jan. 12, 1935            6 Sheets-Sheet 4
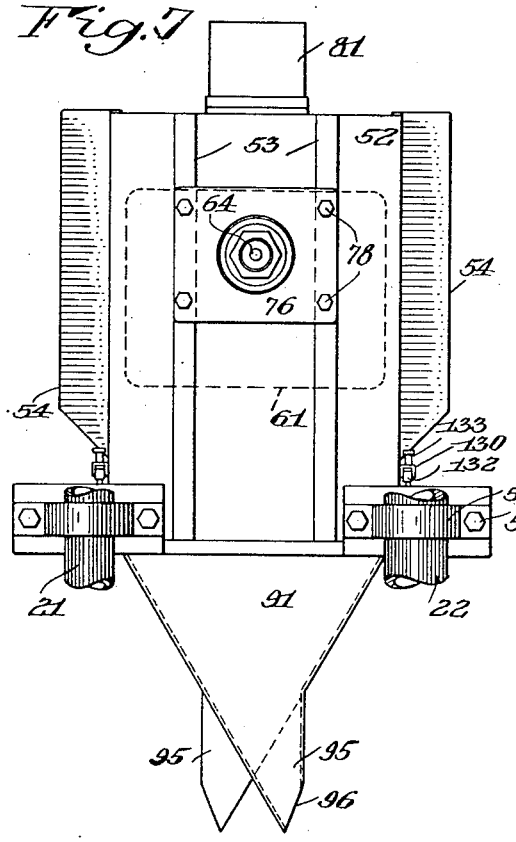
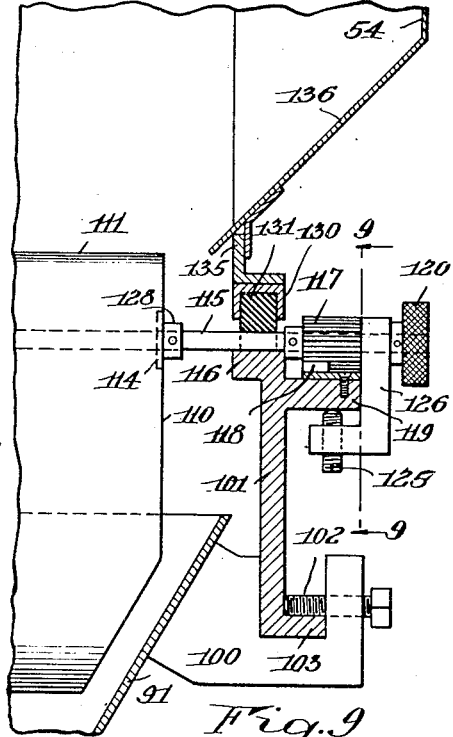
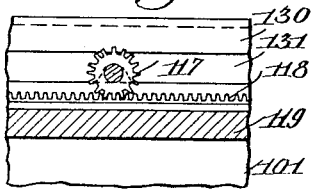
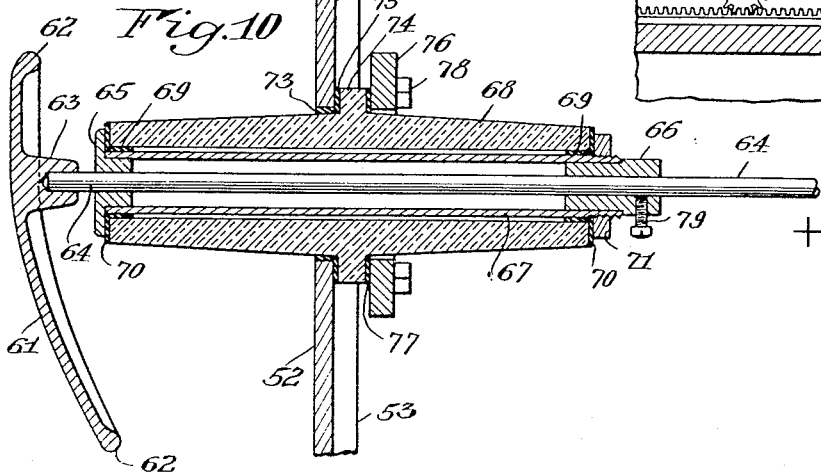
INVENTOR
Brian O'Brien
BY Edward H Cumpston
his ATTORNEY Aug. 8, 1939.   B. O'BRIEN   2,168,681
METHOD AND APPARATUS FOR SEPARATING MATERIALS
Filed Jan. 12, 1935   6 Sheets-Sheet 5
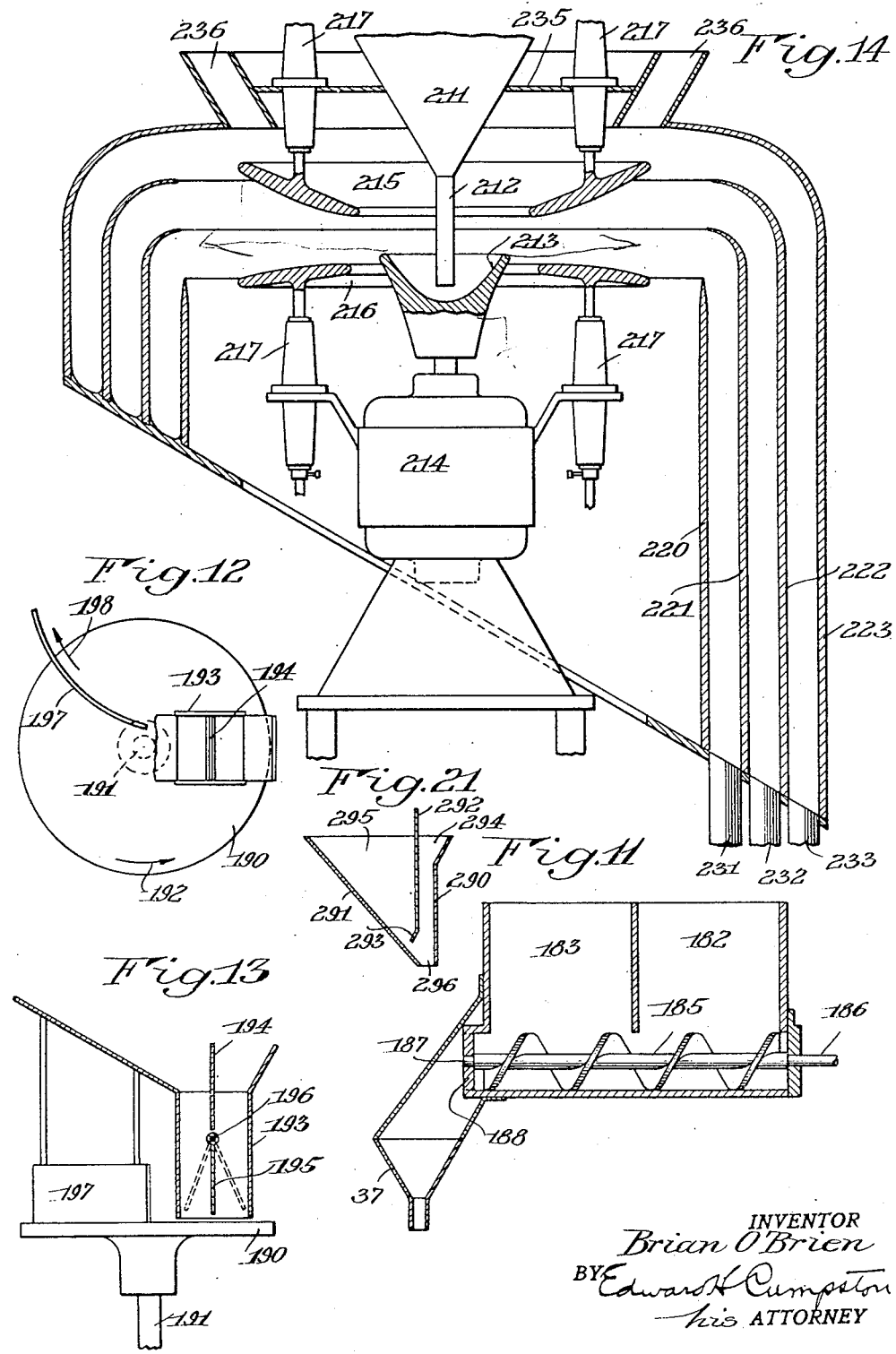
INVENTOR
Brian O'Brien
BY Edward H. Cumpston
his ATTORNEY Aug. 8, 1939.   B. O'BRIEN   2,168,681
METHOD AND APPARATUS FOR SEPARATING MATERIALS
Filed Jan. 12, 1935   6 Sheets-Sheet 6

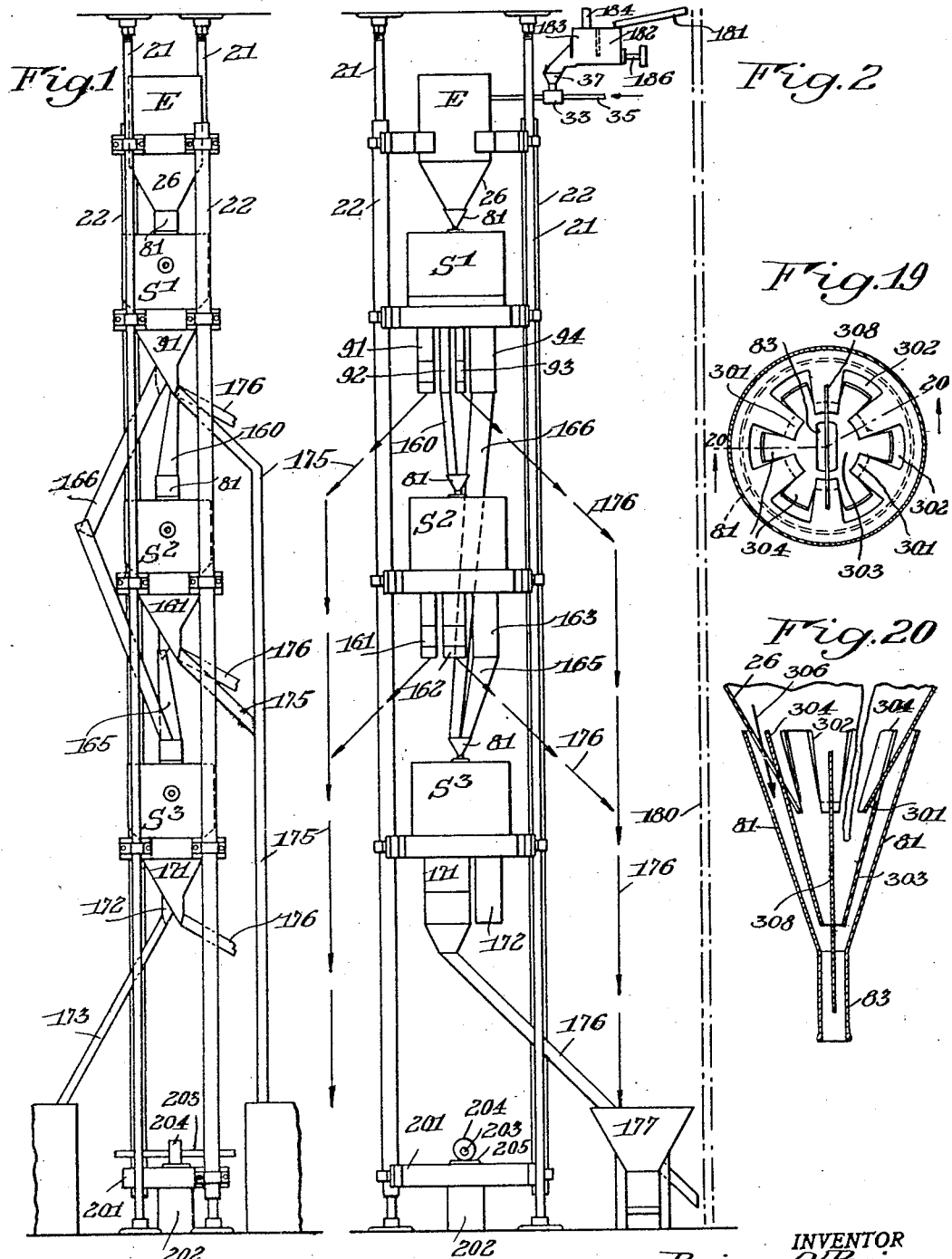

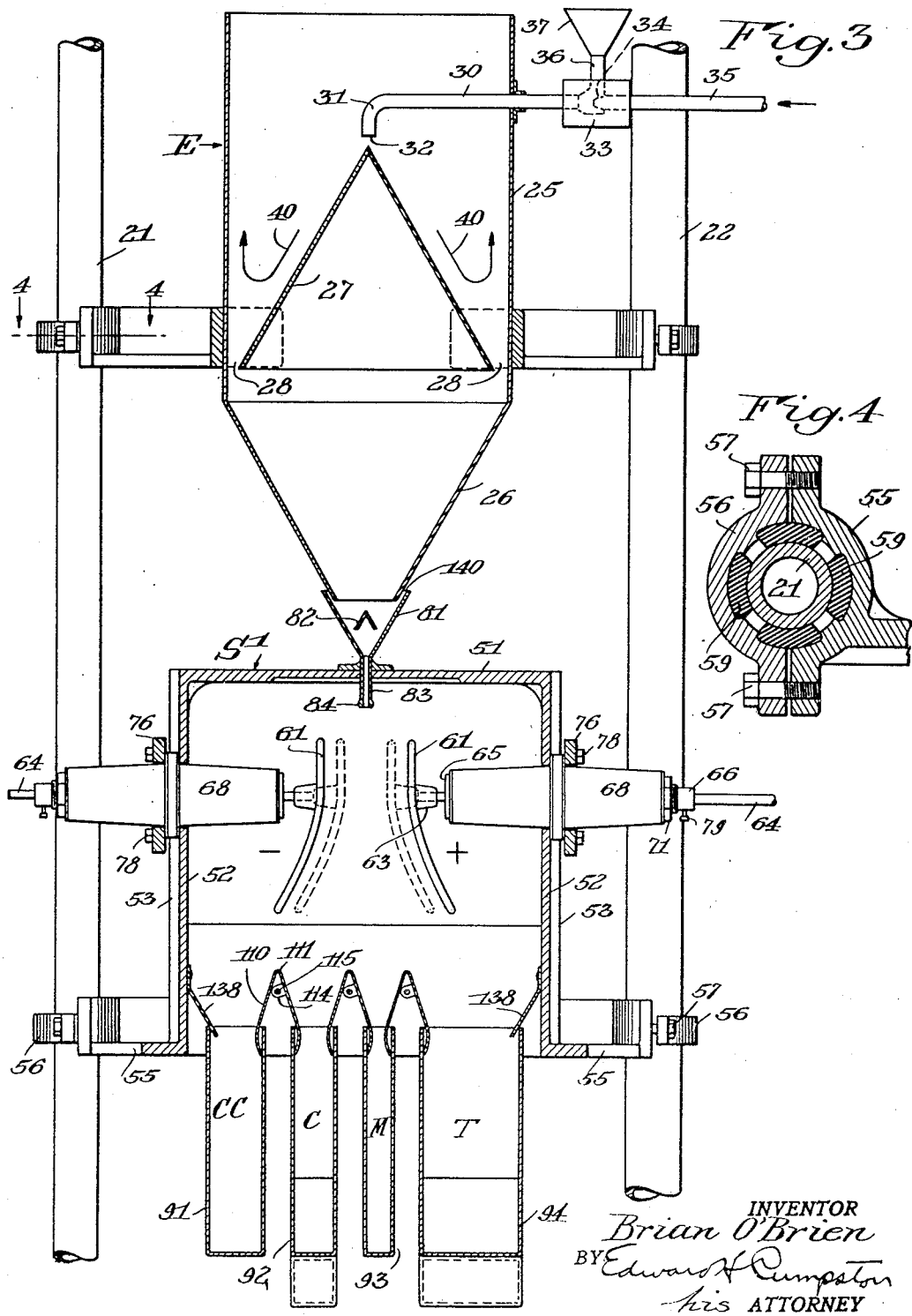

INVENTOR
Brian O'Brien
BY Edward H. Cumpston
his ATTORNEY

Patented Aug. 8, 1939

2,168,681

UNITED STATES PATENT OFFICE 2,168,681

METHOD AND APPARATUS FOR SEPARATING MATERIALS

Brian O'Brien, Rochester, N. Y.

Application January 12, 1935, Serial No. 1,519

20 Claims. (Cl. 209—127)

The present invention deals with a method of electrostatic separation of materials, and with an apparatus for carrying out such method. One object of the invention is the provision of a generally improved and more satisfactory and efficient method and apparatus of this character.

Another object of the invention is the provision of a method particularly applicable to the efficient recovery of valuable minerals from the gangue with which they are associated, and the provision of suitable apparatus for carrying out such a method.

Still another object is the provision of a method and apparatus which have relatively low initial cost and which may be operated at a minimum of expense.

A further object is the provision of a generally improved and more satisfactory method for recovering valuable minerals, particularly applicable to the mining of deposits containing substantial quantities of clay.

To these and other ends the invention resides in certain improvements and combinations of parts, all, as will be hereinafter more fully described, the novel features being pointed out in the claims at the end of the specification.

In the drawings:

Fig. 1 is a diagrammatic elevation of one form of apparatus constructed in accordance with the invention;

Fig. 2 is a view of the same looking at it from a different direction;

Fig. 3 is a vertical section taken substantially centrally through part of the apparatus;

Fig. 4 is a horizontal section substantially on the line 4—4 of Fig. 3;

Fig. 5 is a plan of part of the apparatus with the supporting columns in horizontal section;

Fig. 6 is a side elevation of the parts shown in Fig. 5;

Fig. 7 is an end elevation of the parts shown in Figs. 5 and 6;

Fig. 8 is a fragmentary vertical section illustrating details;

Fig. 9 is a vertical section substantially on the line 9—9 of Fig. 8;

Fig. 10 is a vertical section taken substantially centrally through one of the electrodes and its associated insulator and other parts;

Fig. 11 is a diagrammatic vertical section of one form of feeding mechanism;

Fig. 12 is a plan of a different form of feeding mechanism;

Fig. 13 is a diagrammatic vertical section of the form of feeding mechanism shown in Fig. 12;

Fig. 14 is a diagrammatic vertical section taken substantially centrally through a modified form of the electrifying and separating apparatus;

Fig. 19 is a horizontal section through the lower part of the electrifying apparatus shown in Figs. 1–3, illustrating a modified construction resulting in a greater capacity;

Fig. 20 is a vertical section substantially on the line 20—20 of Fig. 19, and

Fig. 21 is a vertical section illustrating a modified form of ore and middlings feeder.

The same reference numerals throughout the several views indicate the same parts.

Figure 15:
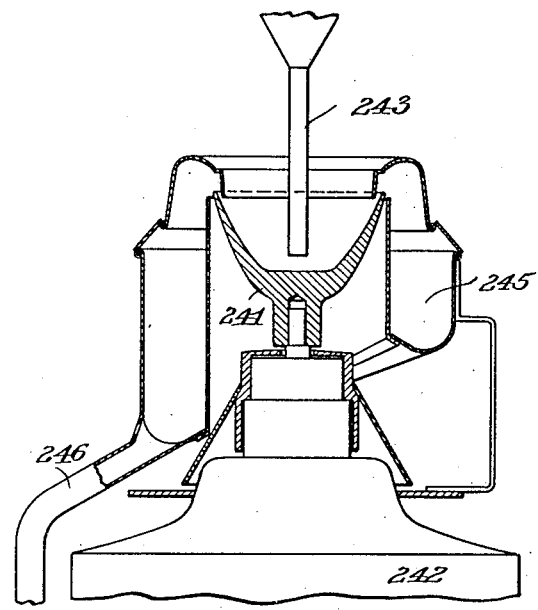
Fig. 15 is a diagrammatic vertical section taken substantially centrally through another form of electrifying apparatus.

It is a known phenomenon that particles carrying electrostatic charges of like sign tend to repel each other and that particles carrying electrostatic charges of different sign tend to attract each other. It has heretofore been proposed to take advantage of this known phenomenon for the separation of a mixture of different materials into its component parts, but the method and apparatus of the present invention give results far superior to any that have heretofore been obtained.

The present invention deals both with the electrification of the particles constituting the mixture, in order to give the different particles the desired electrostatic charges, and also with the subsequent separation of the differentially electrified particles from each other.

The electrification of the particles may be accomplished in a variety of ways, several of which will be described hereafter. In most cases, however, it is desirable that the particles be not highly electrified but have electrostatic charges merely of medium or low potential, in order that there will be but slight forces tending to attract or repel the electrified particles from each other. Then the electrified particles, carrying the charges of medium or low potential, are passed through an electrostatic field of high potential gradient so that the particles carrying the different electrified charges will tend to follow different paths of travel and may be caught in different hoppers or receiving elements. According to this invention, the electrostatic field through which the differentially electrified particles pass, is preferably a field which is substantially or approximately symmetrical with respect to the normal or uninfluenced path of travel of the particles. The path of travel preferably also is out of contact with all of the electrodes which set up the electrostatic field.

The separating part of the apparatus, including the electrodes for setting up the electrostatic field and the hoppers for receiving the separated material, forms, in its preferred embodiment, a unit, and a plurality of such units may be employed if desired, so that the mixture to be separated, or part of it, may pass successively through two or more of the separating units. At times, the material may be re-electrified after passing through one separating unit and before passing through another separating unit, but preferably the material is handled with such rapidity that it does not lose any substantial part of its electrostatic charge during the entire separating process, and thus no re-electrification between successive separating units is usually needed.

A feature of the present invention is the novel and improved manner in which electrification of the mixture is accomplished. As distinguished from some of the prior attempts at electrification, the electrification in the present instance may be, and preferably is, carried out in the absence of any electrical field save such field as may be set up by the electrified particles themselves. Preferably, also, electrification is brought about by a wiping contact between the material to be electrified and a metallic conducting surface which is grounded, or by impact with such a surface, or by both impact and wiping contact.

One preferred form of combined electrifying and separating apparatus, according to the present invention, will now be described in connection with Figs. 1 to 11, inclusive, of the accompanying drawings.

Referring first to Figs. 1 and 2, there is shown an apparatus having an electrifying unit indicated in general by the letter E and three separating units or cells indicated in general by $S^1$, $S^2$, and $S^3$, respectively. These various units are suitably supported, as for example by stationary columns 21 to which the units are flexibly connected and vibrating columns 22 to which the units are rigidly connected so that vibration of these columns will cause corresponding vibration of the electrifying and separating units and of the chutes connected thereto, in order to prevent sticking of the material in the apparatus and to speed up its movement therethrough.

The construction of the electrifying unit E is best shown in Fig. 3. This unit comprises a suitable hopper having, in the present instance, a cylindrical side wall portion 25 and a frustoconical bottom portion 26. Within the hopper is an upright conical member 27 of slightly smaller diameter than the portion 25 so that there is an annular space 28 between the edge of the member 27 and the surrounding wall 25. The member 27 may be supported from the member 25 by suitable radially extending brackets arranged at intervals around the periphery of the member 27, or in any other suitable manner. The parts 25, 26, and 27 are all of a good electrical conducting material, such as sheet metal, and are grounded.

An inlet conduit 30 extends through the side of the member 25 approximately to the center thereof and is then bent as at 31 to extend downwardly to an open end 32 arranged just over the apex of the cone 27. The conduit 30 is preferably also of metal, and is grounded.

The mixture of material to be electrified is introduced through this conduit 30 in any suitable manner. For example, it may be moved through the conduit by pneumatic means. At 33 there is indicated an arrangement somewhat similar to an aspirator or injector, including a nozzle 34 supplied with compressed air or other suitable gas under pressure by means of the conduit 35, and arranged to draw material through the conduit 36 from the hopper 37 and to force this material through the conduit 30 to the open end 32 thereof.

The mixture of material, as for example ore containing a metal or metallic mineral and gangue, is introduced into the hopper 37. Under the influence of the compressed gas issuing from the nozzle 34, the mixture passes through the conduit 30, and has a wiping contact with the walls of the conduit, particularly at the bend 31. After the material issues from the open end 32 of the conduit, it impacts against and slides down the walls of the cone 27 and thus is further electrified both by impact with and by wiping contact over a grounded conducting surface. The air or other gas issuing from the conduit goes part way down the cone 27 and then, when the space becomes more restricted, turns back upon itself as indicated diagrammatically by the arrows 40, and rises upwardly along the inner surfaces of the walls 25, thus separating the air from the material being operated upon, which continues its movement down the cone 27 to the bottom edge thereof and then falls off the cone, through the space 28, and onto the inner surface of the conical portion 26, down which the material continues to slide so that it obtains a further wiping contact with a grounded conducting surface.

This wiping contact with a grounded conducting surface is found in practice to produce the desired differential electrification of the particles making up the mixture. This electrification does not depend upon electricity supplied by any external electrical source; on the contrary, it may be, and preferably is, carried out in the entire absence of any electrical field except such slight field as may possibly be formed by the electrified particles themselves during or after their electrification.

Different materials in different mixtures are affected in different ways by this wiping contact with the grounded conducting surface, and it is difficult to lay down any general rules which will apply under all circumstances. It is sufficient for present purposes to say that actual experimentation has shown that the desired differential electrification is produced in this manner, and the particles of different materials are electrified so that particles of one kind will carry, for example, a positive electrostatic charge, while particles of another kind from the same mixture will have negative electrostatic charges produced in them. Or, in some instances, particles of two different kinds may both be electrified positively, but to different degrees, so that they may still be effectively separated in the separating part of the apparatus even though their electrostatic charges are not of opposite sign.

Tests have also shown that the electrification, unlike that produced by certain prior arrangements, is not dependent upon the conductivity of the particles to be electrified. If a mixture be made of two kinds of particles, both of which are dielectric or non-conductive to a substantially equal degree, the two kinds of material may nevertheless be differentially electrified or be provided with different electrostatic charges, when passed in wiping contact over a grounded conducting surface in accordance with the present invention.

After the mixture of different materials has been electrified as by means of the electrifying unit E, the mixture is then passed through one or more separating units or cells. The different separating cells may all be substantially alike, and their construction in general may be best understood by reference to Figs. 3 to 10, inclusive. Each unit or cell may comprise a main body portion of cast or pressed metal, for example, and of generally inverted U-shape, having a top 51 and ends 52 provided with vertically extending strengthening ribs 53. The sides of this body member may be closed by separate side plates 54 of sheet metal or other suitable material. Brackets 55, which may be integral with the portions 51 and 52, extend laterally to suitable supports such as columns 21 and 22. In the embodiment shown, there are four such brackets 55, at the four corners of each cell, as best illustrated in Fig. 5, each bracket having a rounded approximately semi-circular bearing portion for receiving a vertically extending column, and a complemental rounded semi-circular clamping piece 56 to extend around the opposite side of the column and held to the bracket 55 by bolts 57. The brackets connecting the electrifying apparatus E to the columns may be of approximately the same construction.

Extending upwardly through two diagonally opposite brackets, both of the separating cells and of the electrifying apparatus, are the stationary columns 21 above mentioned, which stationary columns are preferably of somewhat smaller diameter than the bearing openings through the brackets, and blocks 59 (Figs. 4 and 5) of rubber or other suitable flexible material, are interposed between the bearing members and the column, in order that the bearing members and connected parts of the apparatus may be steadied and held in alinement by the stationary columns 21, but with some freedom of movement.

The other columns 22, at the other diagonally opposite corners of the apparatus, are preferably of larger diameter and, as shown in Fig. 5, contact directly with the surrounding bearing parts 55 and 56, which clamp tightly upon these columns 22. Thus when these columns 22 are vibrated by any suitable vibrating apparatus, as described hereafter, the vibrations of the columns 22 will be transmitted to the electrifying unit and the separating units which are rigidly connected to these columns, and the units will thus be correspondingly vibrated to prevent sticking of the material flowing through the apparatus.

All of the metallic parts above mentioned are preferably grounded, which grounding may be accomplished by a suitable ground wire connected to the columns 22, since these columns in turn are directly connected by metal to metal contact with the other metallic parts mentioned.

Within each separating cell, and insulated from the grounded parts thereof, is a pair of electrodes 61 (Figs. 3 and 10), each electrode being preferably in the form of a plate having a substantial area, and having rounded edges as shown at 62 (Fig. 10) in order to avoid corona which might otherwise be caused by the high potential employed. Each electrode plate 61 preferably has a substantially vertical portion near its top and then curves downwardly and away from the opposed electrode, as plainly shown.

Each electrode may be mounted in any convenient manner. For example, as seen in Fig. 10, each electrode may have on its rear face a boss 63 pinned to a rod 64 which passes through metallic bushings 65 and 66 soldered or otherwise secured in the ends of a metallic tube 67. This tube extends through a bore in a tubular insulator 68 and is of slightly smaller diameter than the bore in the insulator, being spaced therefrom in a radial direction by annular gaskets 69 of rubber or other suitable flexible material. Other gaskets 70 of rubber or the like are provided at the ends of the insulating tube 68 so that when a nut 71 threaded on the exterior of the metal tube 67 is tightened, the parts 65 and 71 will draw up against the gaskets 70 rather than directly on the insulator 68.

The insulator 68 passes through an opening in the end wall 52 of the separating cell, which opening is of somewhat larger diameter than that of the insulator 68, and a gasket 73 of rubber or other flexible material is interposed between the insulator 68 and the surrounding edge of the opening in the member 52. The insulator 68 has near its middle an outwardly projecting flange 74 which lies near the outer side of the wall 52 but is spaced therefrom by a gasket 75. An apertured plate 76 (Figs. 7 and 10) lies on the opposite side of the flange 74 from the wall 52 and is spaced from the flange by another flexible gasket 77. The plate 76 is bolted to the ribs 53 by bolts 78 which, when tightened, hold the insulator flange 74 firmly between the gaskets 75 and 77 so that the insulator is properly held but the metal parts do not come into direct contact with the porcelain or other dielectric material of which the insulator is constructed.

The use of the various gaskets above described is desirable because of the fact that the entire separating cell is vibrated as above mentioned. If the insulator 68 were mounted rigidly on the wall 52, or if the electrode 61 were mounted rigidly on the insulator, the constant vibration might chip or crack the insulator, but with the slight flexibility provided by the various gaskets mentioned, danger of damage to the insulator is obviated and yet the entire insulator and electrode assembly may vibrate with the rest of the separating cells.

A set screw 79 (Fig. 10) threaded into the member 66 contacts with the electrode rod 64 and holds it in fixed position with respect to the insulator assembly. When this set screw is loosened, the rod 64 may be moved longitudinally through the insulator, and thus the two electrodes may be adjusted closer to or farther away from each other, as indicated by the dotted line and full line positions in Fig. 3.

The electrode rods 64 are connected to a suitable source of high potential in such manner that one electrode carries a high potential electrostatic charge of one sign and the other electrode carries a charge of the opposite sign. In the arrangement shown in Figs. 3, 5, and 6, the right hand electrode 61 is considered to be charged positively and the left hand electrode to be charged negatively, but obviously the sign of the charge may be reversed if desired.

The electrified mixture to be separated is passed through the separating cell between the two spaced electrodes and through the high potential electrostatic field created by them. For example, mounted on the top wall 51 of the cell there may be sloping walls 81 forming a hopper for receiving the electrified material, this hopper being of substantial width in a direction across the separating cell from one side thereof to the other. A member 82 of inverted V-shape may be placed in the hopper as shown in Fig. 3 to assist in distributing the material approximately uniformly throughout the width of the hopper. At the bottom of the hopper are spaced walls 83 forming a delivery slot which, like the hopper 81, has a substantial width in a direction across the separating cell, as shown in Fig. 5, but which has only a slight thickness in a direction lengthwise of the cell, as shown in Fig. 3, so that the material issuing from the slot will issue in the form of a thin layer or curtain of falling particles. The lower edges of the walls 83 forming this slot are rounded as indicated at 84 so as to avoid any danger of corona which might be caused by sharp edges.

Within the slot may be a plurality of thin vertical partitions 85 (Fig. 5) extending across the thickness of the slot to aid in guiding the material in a downward direction so that it will issue approximately straight downwardly and without any substantial horizontal component of velocity.

The slot formed by the walls 83 lies preferably in a vertical plane substantially midway between the two electrodes. Hence the material as it issues from the slot falls downwardly in a path of travel which may be said to be substantially out of contact with both electrodes, and passes through an electrostatic field which may be said to be approximately symmetrical with respect to the path of travel of the material as a whole. Of course, this electrostatic field will tend to deflect the material in accordance with the electrostatic charges of the different particles of material, but nevertheless it is true that, with relation to the path of travel of the material as a whole, the electrostatic field is approximately symmetrical. A minor part of the material may even be deflected to such an extent that it may hit one of the electrodes and either stick to it or bounce off of it to the other electrode, but this again is an abnormal condition, not true of the great majority of material passing through the apparatus, and it may be correctly said that the normal path of travel of the material is out of contact with both electrodes.

When the differentially electrified material has been passed through the electrostatic field and has been differentially deflected thereby, it may be caught in various hoppers arranged to catch different classes of material in accordance with the direction and degree of deflection of the material. Any convenient number of such hoppers may be provided. In the embodiment here shown, the first separating cell S¹ has four hoppers, indicated by the respective numerals 91, 92, 93, and 94. Each hopper may be of sheet metal construction as indicated in Fig. 3 and may be of approximately V-shape in side elevation as shown for example in Fig. 7, except that near the bottom of each hopper there is a lateral delivery spout 95 ending in a delivery opening 96. Each hopper may be symmetrical about its center line when viewed as in Fig. 7, except with respect to the delivery spout 95, which lies entirely on one side of the center line as shown, so that if alternating hoppers are turned end for end the delivery spouts of alternating hoppers will project in opposite directions from a central vertical plane passing through the hoppers, with the result that the delivery spouts will be conveniently accessible for discharge into different chutes or the like.

The hoppers may vary in thickness as indicated in Figs. 3 and 6, but irrespective of thickness each hopper may conveniently be supported in the same manner, by means of a bracket 100 at each end of the hopper extending around the bottom edge of a horizontal bar or rail 101 and having a set screw 102 overlying and supported by a bottom flange 103 on the rail 101. Two of these rails 101 are provided, one at each side of each separating cell, and the rails are bolted as at 105 to the end members 52 or bracket member 55 of the cell. By loosening the set screws 102, the hoppers may be readily shifted lengthwise of the rails 101 to different positions.

Between each two adjacent hoppers is a member 110 of flexible sheet metal of generally inverted V-shape with its upper edge slightly rounded as at 111 in Fig. 3, to prevent formation of corona, and with its lower edges extending over and embracing the adjacent side walls of the two adjacent hoppers in the manner shown in Fig. 3. Preferably the member 110 is curved near its lower edges so that it engages the walls of the hoppers only at points somewhat below their top edges, as shown, with the result that the upper rounded edge 111 is relatively free to move back and forth in the direction of the thickness of the hoppers. This member 110 forms an inverted trough extending substantially all the way across the apparatus through the full width of the hoppers, one end of one of these members 110 and one edge of an associated hopper 91 being shown in Fig. 8.

Since the members 110 serve to direct the falling material into the respective hoppers, it is apparent that some adjustment of the classification of the material may be obtained by shifting the upper edges 111 back and forth in a direction lengthwise of the apparatus (that is, in the direction of a line passing from one electrode 61 to the other) without the necessity of moving the actual hoppers themselves. For the purpose of effecting such adjustment of the upper edge of each member 110, each member is provided with an ear 114 near each end, which ear has a hole through it, and a rod or shaft 115 passes through the hollow space within each member 110 and through the alined holes in the two ears 114 of that member and projects beyond the member 110 at each end to overlie and rest on an upper flange 116 of each rail 101. Beyond the flange 116 the shaft 115 is provided with a pinion 117 (Figs. 8 and 9) meshing with a toothed rack 118 secured to a lateral flange 119 on the rail 101. At each end of each shaft 115, beyond the pinion 117, is a knurled knob 120 by means of which the shaft may be readily turned. When so turned, meshing of the pinions 117 with the racks 118 causes the entire shaft to roll in one direction or the other along the rail 101 and thus to move the upper edge of the member 110 in one direction or the other lengthwise of the separating cell, while the lower edges thereof still embrace the walls of the two adjacent hoppers as in Fig. 3.

When the parts have been adjusted in this manner to the desired position, they may be held securely in this position by tightening set screws 125 (Fig. 8) in hangers 126 placed on the shafts 115 between the pinions 117 and the knobs 120. Tightening these set screws tends to pull the hangers 126 downwardly thus clamping the pinions 117 on the shafts tightly against the racks 118 and preventing any movement of one relatively to the other.

Collars 128 on the shafts 115 just outside of the ears 114 serve to prevent the members 110 from moving longitudinally along the shafts.

Above the top flange 116 of each rail 101 is a channel member 130 embracing a strip of soft rubber 131 which rests upon the shafts 115. The channel 130 extends at each end beyond the ends of the rubber strip 131 and there receives guiding pins 132 (Figs. 6 and 7) projecting upwardly from the top flange 116 of the rail 101. Thumb screws 133 may be tightened to press the channel 130 downwardly so that the rubber strip 131 is firmly engaged with the tops of the shafts 115 in order to prevent chattering of those shafts during the vibration of the apparatus, and also to act somewhat as a seal for the sides of the apparatus, though not necessarily as a perfectly air tight seal. Running along the top of the channel 130 is an angle member (Fig. 8) having an upstanding flange 135 which is engaged with an inwardly sloping wall 136 at the bottom of the side plate 54 of the separating cell.

Deflecting members 138 (Fig. 3) fixed to the end walls 52 overlap the first and last hoppers 91 and 94 so that all of the material passing through the apparatus will be surely directed into one hopper or another and no material can escape between the hoppers 91 and 94 and the respective end walls 52.

In the case of the first separating cell S¹, the hopper 81 of this cell preferably receives the electrified mixture directly from the lower end 26 of the electrifying apparatus E, as shown in Fig. 3, but preferably there is a gap or space 140 between the hopper 81 and the member 26 so that if the air stream has not been completely separated from the electrified material by the member 27, the air may escape through the gap 140 and will not be forced into the separating apparatus. It is desired in most cases to pass the electrified material through the electrostatic field merely by the use of the force of gravity and without any air currents which might interfere with the proper flow of the material. In some cases, however, the particles may be advanced through the separating cell by means of an air stream, in which event the casing is preferably so designed that no turbulence occurs within the separating cell.

As the electrified particles slide down the members 27 and 26, they are mostly separated from each other to a considerable extent and hence are in a favorable situation to carry their electrical charges at relatively low potential. As they pass into the hopper 81 and chute 83, however, the particles become more bunched together, with the result that their electrical capacities decrease and the charges which they are already carrying cause the potential to increase. When it is attempted to run the apparatus at a relatively high rate, this bunching of the material in the portion 81 may cause the potential of the electrostatic charge to rise to such a high point that the particles lose part of their charges by actual sparking over or electrical break-down of the surrounding air. This, in turn, lowers the efficiency of the subsequent separation.

This objectionable loss of electrostatic capacity may be largely avoided, and the rate of flow of the material through the apparatus may be largely increased, by employing the modified construction shown in Figs. 19 and 20, to take the place of the simpler construction of the parts 26 and 81 shown in Fig. 3. The upper part of the member 26, in this modified construction, remains as in Fig. 3, but the lower part of it is provided with a series of depending tongues 301 having between them slots 302. A frusto-conical sheet metal member 303 has its upper portion formed with tongues 304 which extend through the slots 302 of the member 26, and slots intermediate the tongues 304, through which slots the tongues 301 extend, in the manner indicated in the drawings. The member 303 may be held in place by a locking engagement between the side edges of the tongues 304 and the side edges of the tongues 301 on the member 26.

With this arrangement, the electrified particles sliding down the wall 26 will be divided into two groups. Those particles which slide down the tongues 301 will pass from the ends of those tongues into the interior of the member 303, while those particles which slide down in alinement with the slots 302 will drop through those slots in the direction of the arrow 306 into the annular space between the members 81 and 303. The particles falling inside the member 303 may be further subdivided by a central partition 308 of sheet metal or the like, which may if desired extend part way down into the slot member 83.

The parts 303 and 81 are made of a steeper inclination than the member 26, so that the velocity of the particles is increased as they pass through these members 303 and 81 and consequently bunching is avoided. Furthermore, even if bunching occurs, the bunched particles are divided into small masses by the partitions, which are grounded metallic surfaces. Thus the electrostatic capacity of the particles is maintained at the desired high level, not only by the avoidance of bunching but by reason of the close proximity of the particles to the metallic members 81, 303, and 308, which has the effect of increasing the electrostatic capacity of the near by particles.

When the discharge end of the electrifying apparatus is constructed in this modified manner shown in Figs. 19 and 20, rather than in the manner shown in Fig. 3, the tonnage of ore which may be put through the apparatus within a given time may be considerably increased without sacrifice of the quality of the separation.

For the sake of example let it be assumed that the material being treated is a mixture in which the mineral or other valuable material to be recovered will be electrified positively and in which the gangue will be electrified negatively. Under these circumstances, the material to be recovered will, during its travel through the electrostatic field, be deflected toward the negative electrode, while the negatively charged gangue will be deflected toward the positive electrode. In practice the separation, while highly efficient, is not perfect and different portions of the material will be deflected through different amounts or degrees as well as in different directions.

The particles of relatively pure mineral of the kind which it is sought to separate from the gangue will be most highly electrified positively, and thus will be most strongly deflected toward the negative electrode and will fall into the hopper 91, which may be conveniently called the clean concentrate or "CC" hopper. The valuable mineral which is slightly less pure and which, therefore, is electrified positively to not quite such a high degree will be deflected not quite so far toward the negative electrode and will fall into the second hopper 92, which may be referred to as the concentrate or "C" hopper. The material which is practically entirely gangue and contains no appreciable amount of the valuable mineral will be most strongly electrified negatively and thus will be most strongly deflected toward the positive electrode and will fall into the hopper 94, which may be referred to as the tailings or "T" hopper. There will be some material which is electrified either not at all, or slightly negatively, as for example a mixture of gangue and valuable mineral which for one reason or another sticks together and does not become sufficiently differentiated, and this will be deflected either not at all or slightly toward the positive electrode and will fall into the hopper 93 which may be referred to as the middlings or "M" hopper. The sizes of the various hoppers, in the direction of their thickness, may be varied according to the circumstances of each particular case as determined by experience. In Fig. 3 it is seen that the tailings hopper 94 is thicker than any of the others and that the middlings hopper 93 is the thinnest of all, though the dimensions may be varied at will.

In many instances a single passage through the electrostatic field as above described may be sufficient to produce the desired separation. In most cases, however, further passage of part of the material through an additional separating cell is desirable. For example, referring now to Figs. 1 and 2 in conjunction with Fig. 3, the material from the concentrate or "C" hopper 92 of the first cell S¹ may be delivered through a chute 160 to the feeding hopper 81 of a second separating cell S². The second cell S² may conveniently be provided with three receiving hoppers, a hopper 161 forming a cleaned concentrate or "CC" hopper and a hopper 162 forming a middlings or "M" hopper, and a hopper 163 forming a tailings or "T" hopper.

The tailings from the "T" hopper 163 of the second cell may be delivered by a chute 165 to the hopper 81 of the third or scavenging cell S³, and the tailings from the "T" hopper 94 of the first cell S¹ may likewise be delivered through a chute 166 to the third or scavenging cell S³ so that this cell handles the tailings from both of the preceding cells. The scavenging cell S³ may conveniently be provided with two receiving hoppers 171 and 172, of which the first is a middlings or "M" hopper, while the hopper 172 contains nothing but tailings which have been twice classified as tailings by passage through two separate cells, and thus it may conveniently be called a "TT" hopper. The tailings from the hopper 172 may be discarded, as through a chute 173.

The cleaned concentrate from the two hoppers 91 and 161 may be collected through any convenient chute indicated diagrammatically at 175 and disposed of as desired. For example, this cleaned concentrate may be shipped to a smelter, or in some instances it may be sufficiently high in the desired valuable mineral so that it may be sold or used without further refining.

The middlings from all three middlings hoppers 93, 162, and 171 may be collected by a chute system indicated diagrammatically at 176 and collected in a middlings bin 177, for such further treatment as may be desired. Preferably, these middlings are again run through the apparatus in order to obtain a more efficient recovery of any valuable mineral remaining in the middlings.

The middlings may be fed back into the apparatus either intermittently or continuously, but in most cases it is preferred to feed them continuously and yet at the same time to feed in as much fresh material as is possible, along with the middlings. In order to be wholly satisfactory, a feeding mechanism for feeding middlings and fresh ore to the apparatus should be so designed and constructed that it will give precedence to the middlings in order that the middlings may return quickly to the separating apparatus while they are still hot and dry, and will not be delayed by being crowded out by the fresh ore.

One satisfactory form of feeding mechanism satisfying these requirements is illustrated in Figs. 2 and 11, to which reference is now made. The middlings from the bin 177 are elevated by any suitable conveyor, such as a bucket conveyor, indicated diagrammatically at 180, and are delivered through a chute 181 to a bin 182. Next to this bin 182 is a second bin 183 which receives the fresh ore or other material from any suitable source, such as through the chute 184. At the bottom of the bins 182 and 183 and in communication therewith is a screw conveyor 185 having one end 186 extending outside the bin to be constantly rotated by any suitable source of power and its other end 187 journaled in a suitable bearing member 188. The screw 185 is turned in a direction to feed material from the end 186 toward the end 188, or in a leftward direction when viewed as in Figs. 2 and 11. Since the middlings bin 182 is to the right of the ore bin 183, it follows that the convolutions of the screw will first be filled with middlings which will be carried leftwardly and dumped from the left hand end of the screw into the bin 37. As long as any substantial quantity of middlings remains in the bin 182, the middlings will fill the convolutions of the screw practically completely, and as these middlings are carried forward by the screw they will prevent fresh ore from the bin 183 from entering the convolutions. When the bin 182 contains only a relatively small amount of middlings, however, then the convolutions of the screw will not be filled by the middlings, and there will be room in these convolutions for the screw to pick up fresh material from the bin 183 and feed it also forwardly and dump it into the hopper 137. In this way, the feeding mechanism gives precedence to the middlings at all times and feeds the fresh ore only as fast as this can be done without interfering with the feeding of middlings.

When the middlings or fresh ore or mixture of both is received in the hopper 37, it is drawn thence into the electrifying and separating apparatus by the air jet issuing from the nozzle 34, as previously described.

A different form of feeding apparatus which will likewise insure proper feeding of the middlings is illustrated in Figs. 12 and 13, to which reference is now made. A substantially horizontal turntable 190 is mounted at the upper end of a vertical shaft 191 which is driven to move the turntable constantly in the direction of the arrow 192. Above this turntable and coming down close to its upper surface is a chute 193 leading from a bin which is divided into two parts by an intermediate partition 194 which extends part way down into the chute 193. Immediately below the bottom edge of the partition 194 is a swinging gate 195 mounted to swing freely on a horizontal axis 196 at its upper edge.

As the turntable 190 rotates, material in the chute 193 will be deposited on the turntable and will, by the rotation of the turntable, be drawn out from the bottom of the chute in a thin layer determined by the clearance between the bottom of the chute and the top of the turntable. Middlings may be placed in the bin on one side of the partition 194, and fresh ore on the other side of the partition 194. As long as there are substantially equal amounts of middlings and fresh ore in the bin, the respective pressure of the middlings and fresh ore in the chute 193 will be substantially equal and the swinging gate 195 will remain substantially vertical, as shown in full lines in Fig. 13, with the result that approximately equal quantities of middlings and ore will be deposited on the turntable 190 and fed thereby. If the middlings pile up in the bin to a greater height than the fresh ore, then the pressure on the middlings side of the partition 194 will be greater than the pressure on the ore side, and this increased pressure will tend to swing the gate 195 laterally across the ore side of the chute 193 to one of the dotted line positions indicated in Fig. 13. This will diminish the delivery of ore to the turntable 190 while increasing the delivery of middlings thereto. When the increased rate of feeding of middlings has again established the proper equilibrium between the middlings remaining in the bin and the fresh ore remaining in the bin, the gate will swing back to its vertical position. Similarly, if the supply of ore in the bin appreciably exceeds the supply of middlings, the swinging gate will be forced over to the middlings side of the chute 193 and will diminish the feeding of middlings and increase the feeding of ore until proper equilibrium is again established.

The material deposited on the turntable 190 and carried thereby out from under the chute 193 is scraped off of the revolving turntable by a suitable scraper 197 so that the material leaves the turntable in the direction of the arrow 198 and falls into the receiving hopper 37 of the electrifying and separating apparatus.

Still another and somewhat simpler form of feeder is illustrated diagrammatically in Fig. 21, which shows a bin having one substantially vertical side 290 and an inclined side 291. In the bin is a fixed partition 292, extending across the entire width of the bin and approximately vertical except for a lower edge portion 293 which extends obliquely toward and close to the wall 291. The middlings are deposited in the portion 294 of the bin, between the wall 290 and the partition 292, while the heads or fresh ore is deposited in the portion 295, between the partition 292 and the sloping wall 291. The materials are discharged through the outlet 296, either directly into the hopper 37, or preferably onto a revolving turntable such as 190 or other device by which the rate of feed may be controlled.

Actual trial shows that, with this arrangement, middlings will be discharged through the outlet 296 as long as there are any middlings in the space 294, but the heads will not be discharged from the space 295 as long as there are any middlings in the space 294. Whenever the level of the middlings in the space 294 rises appreciably above the bottom edge of the lip 293, the middlings have the effect of holding back the heads and preventing discharge thereof past the lip 293. Only when the middlings level falls below the lip 293, will the heads be permitted to flow down to the discharge opening. Thus the desired result is achieved of giving precedence to the middlings at all times.

As previously mentioned, it is desirable that the apparatus be shaken in order to prevent material from sticking in the bins, chutes, or other parts of the apparatus, and as already explained, this may be accomplished by vibrating the columns 22. Vibration of the columns may be brought about in any suitable or known manner, such as an electric or pneumatic hammer, or the like. In the embodiment here illustrated, the two columns 22 are joined to each other at their bottom ends by a diagonal beam 201 rigidly secured to the columns and supported by a resilient support 202, such as a spring, a block of soft rubber, or the like. A horizontal shaft 203 is constantly rotated from a suitable source of power and carries an eccentric 204 which, during the rotation of the shaft, engages rapidly and repeatedly with an anvil 205 on the beam 201 and thus strikes the beam a sharp blow forcing it slightly downwardly against the action of the resilient support 202. In this way, the beam 201 and the two columns 22 are repeatedly vibrated up and down, and all of the parts of the electrifying and separating units are likewise vibrated because they are mounted on these columns 22.

If the vibration of the apparatus is not sufficient to prevent accumulation of some material on the electrode plates, the apparatus may be shut down at periodic intervals and the source of potential disconnected from the electrodes, the electrodes also preferably being grounded at this time. Then, if continued vibration is not sufficient, in the absence of an electrostatic field, to remove the material adequately from the electrodes, the material may be scraped or brushed from them, but in many cases the vibration alone will be sufficient, when the electrostatic field is destroyed, to shake the accumulated material loose from the electrodes. As already stated, it is only a very minor proportion of the material which sticks to the electrodes, and the normal path of travel of the material through the apparatus is intended to be entirely out of contact with all of the electrodes.

In the forms of apparatus illustrated in Figs. 1 to 13 inclusive, the force of gravity has been relied upon to feed the material through the separating cells. In some instances, it is desired to have the material move with greater rapidity than can be attained by gravity alone, and other and greater forces may then be employed to move the material through the apparatus. In Fig. 14, there is illustrated an alternative form of electrifying and separating apparatus in which the material is moved by centrifugal force, rather than by the force of gravity, and by means of which apparatus great capacity can be attained. In this centrifugal machine, the material supplied to the hopper 211 flows downwardly through the chute 212 into a centrifugal cup 213 rotated constantly at high speed about a substantially vertical axis, as by means of a motor 214. When the material enters the cup 213, centrifugal action throws the material radially outwardly from the lip of the cup at high speed, and the material passes through a high potential electrostatic field set up by an upper annular electrode 215 and a lower annular electrode 216, both of which electrodes are suitably supported, preferably in an adjustable manner, by insulators 217 which may be similar in construction to the insulator illustrated in Fig. 10.

The electrodes 215 and 216 carry high potential charges of opposite sign, and each electrode has a relatively large surface and has rounded edges to reduce the danger of corona.

The cup 213 is made of metal which is a good conductor of electricity, and is grounded. When the material deposited in the cup moves rapidly outwardly over the surface of the cup due to centrifugal action, it is subjected to a wiping contact with this grounded metallic surface and thus becomes differentially electrified just as in the case of the electrifying apparatus E previously described. It is to be emphasized that this electrification of the material is entirely independent of the electrostatic field set up by the electrodes 215 and 216, and in fact the cup may, if desired, be suitably shielded from the electrostatic field so that the cup is not subjected to any electrical field other than that produced by the electrification of the particles as they move over the surface of the cup.

After the differentially electrified particles leave the cup and are projected by centrifugal force through the electrostatic field, those particles which carry the strongest positive charges will be most strongly deflected toward the negative electrode, those particles which carry less strong positive charges will be deflected toward the negative electrode to a lesser extent, and those particles which carry negative charges will be deflected more or less toward the positive electrode, in accordance with the strength of their charges. Thus the differentially electrified particles will take different paths of travel, although the paths of travel of all particles will be in general outwardly from the cup between the two annular electrodes and normally out of contact with both of them. The differentially electrified particles having different trajectories may be separated or classified by being separately caught in various bins or hoppers. For example, annular partitions 220, 221, 222, and 223 may be provided to form, between them, annular receiving bins or hoppers, the upper edges of some of the partitions being curved over and extending inwardly as plainly illustrated in Fig. 14 in order that these edges may be in the most effective position for catching the discharged material and classifying it properly. The bottoms of the annular hoppers are preferably inclined as shown, so that the material discharging into each hopper will run around and accumulate in one side of the hopper, from which it may be discharged through suitable conduits 231, 232, and 233.

The centrifugal action of the rotating cup 213 will cause a flow of air downwardly through the central opening of the upper electrode 215 and upwardly through the central opening of the lower electrode 216, and thence outwardly between the two electrodes in approximately the same direction in which the ore itself moves. As there may be some tendency for dust or very fine ore to deposit upon and accumulate on the top of the upper electrode 215, the air current induced by the centrifugal action may be conveniently utilized as an aid in removing any such dust or ore from the electrode. For example, a partition 235 closes the top of the apparatus except for an annular frusto-conical air slot 236 which, as seen in the drawings, is directed downwardly toward the top of the electrode 215. The air tending to be drawn into the top of the apparatus can enter only through this slot 236, and thus the entering air is directed against the top surface of the upper electrode 215 and tends to displace any dust on the top of this electrode.

It is apparent that centrifugal force may be used for accomplishing either the electrification of the material to be treated, or the movement of the electrified material through the separating part of the apparatus (that is, the electrostatic field and associated parts), or both. In the embodiment shown in Fig. 14, the centrifugal force is employed both in producing the electrification and in subsequently moving the material through the electrostatic field. If desired, however, the material could be previously electrified by some other means (as for example, by the electrifying apparatus E, Fig. 3) before being deposited in the cup 213, and the centrifugal movement produced by this rotating cup could be utilized, not for electrification, but only for moving the material through the electrostatic field at a rapid rate. In such a case the cup might be made of non-conducting material, if it were desired to produce no further electrification in this cup. There are, however, certain objections to a non-conducting cup, one of the more serious objections being that its behaviour is erratic. At first, some of the material may be electrified until a charge is built up upon the cup, and then no further electrification would take place unless the electrical charge of the cup is wholly or partly discharged in some manner.

On the other hand, it is possible to use a centrifugal cup only for electrification and not for subsequently moving the material through the electrostatic field. When this is desired, the material after being electrified by a centrifugal cup could then be passed by gravity through one or more separating cells as in the embodiment illustrated in Figs. 1 to 10 inclusive. A form of apparatus for accomplishing only the electrification by centrifugal action is illustrated diagrammatically in Fig. 15, to which reference is now made.

Here the cup 241 is rapidly rotated about a vertical axis, as before, by means of a motor 242, and material to be electrified is fed into the cup through a chute 243. The cup is made of good conducting material, and is grounded. The material entering the cup is caused by centrifugal action to move outwardly in wiping contact with the cup, and thus becomes electrified. It is shot from the periphery of the cup into an annular catching hopper 245 having an inclined bottom down which the material slides to be accumulated at one side, where it flows through a chute 246 to any suitable form of separating apparatus, such as that shown in Figs. 1 to 10 inclusive.

Figure 16:
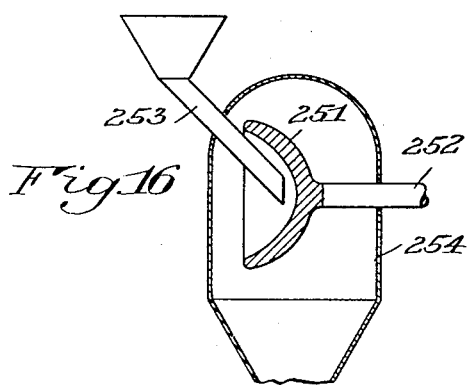
Fig. 16 is a similar view of a different form of such apparatus.

In both of Figs. 14 and 15 the rotating cup has been shown in an upright position, because ordinarily this is the most convenient position for the cup. It is not essential, however, to have the cup upright, but it may be inverted or inclined at any desired angle because the centrifugal forces produced by the cup are so much greater than the forces of gravity acting upon the particles that the material may be shot from the cup in practically any direction desired, independent of gravity. For example, as seen in Fig. 16, the cup 251 may be placed on a substantially horizontal chute 252 and fed with material from an inclined shaft 253. Centrifugal force will cause the particles to issue from the cup in an approximately vertical plane, and they will be caught in a receiving hopper 254 and then delivered to the separating apparatus.

Figure 17:
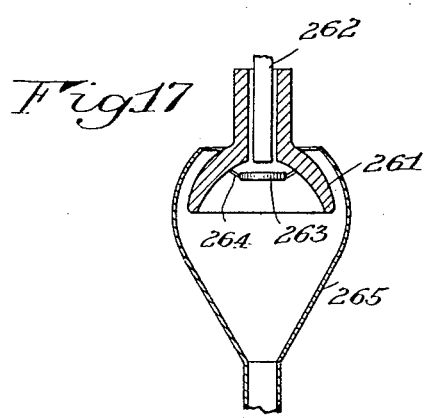
Fig. 17 is a similar view of still another modification of the electrifying apparatus.

As shown in Fig. 17, the cup 261 may rotate in an inverted position, and may be supplied with material through a conduit 262 discharging into a receiving plate 263 secured within the cup by radial arms 264. Since the receiving plate 263 rotates with the cup, it follows that the material deposited on this plate will be forced rapidly outwardly by centrifugal action and will slide outwardly and downwardly along the inner surface of the cup 261, thus obtaining a wiping contact with the grounded metallic surface of the cup and thereby becoming differentially electrified. The material is caught in a receiving hopper 265 and delivered to any suitable separating apparatus.

In any of these forms of centrifugal cups, the material after leaving the cup may come into contact with and wipe over the surface of the surrounding receiving hopper. Thus the receiving hopper may conveniently be made of conducting metal suitably grounded, so that additional differential electrification may be obtained by contact between the material and the hopper after the material leaves the cup.

Figure 18:
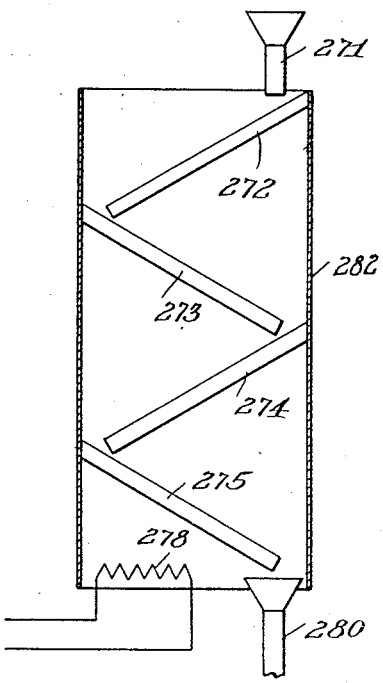
Fig. 18 is a diagrammatic view of a further modification of the electrifying apparatus.

If it is desired to electrify the material without the aid of a pneumatic jet as in Fig. 3 and without the aid of centrifugal force as in Figs. 14 to 17 inclusive, then electrification may be obtained satisfactorily in many instances merely by the use of gravity. Referring now to Fig. 18, the material to be electrified may be introduced through a chute 271 to a series of inclined chutes 272, 273, 274, and 275, down which the material successively flows. Obviously any number of such chutes may be employed. These chutes are of some metal which is a good conductor of electricity and are grounded. Hence, as the material flows by gravity down the chutes, it will have a wiping contact with a grounded metallic surface and may become differentially electrified. For best results, in this as in other forms of electrifying apparatus, the material should be quite dry, and heat is also an aid in producing proper electrification. An electric heating element 278 may accordingly be provided near the bottom of the apparatus shown in Fig. 18, so that heat therefrom will rise upwardly as the material travels down the series of chutes, with the result that the material will be thoroughly dried and heated to obtain best electrification results. The electrified material when it issues from the bottom inclined chute may flow into a conduit 280 from which it is delivered to any suitable form of separating apparatus.

The gravity form of apparatus illustrated in Fig. 18 is preferably enclosed in a casing 282 to prevent lateral draft from blowing away any of the fine material, but the casing may be open wholly or partially at top and bottom in order that there may be an upward draft of hot air heated by the heating element 278. The whole chute assembly is preferably vibrated in order to facilitate rapid flow of the material down the chutes.

In all the forms of separating apparatus, the electrode plates preferably carry electric charges of opposite sign, as above explained. Sometimes, however, it is easier for electrical reasons to operate with one of the electrode plates grounded, which slightly disturbs the symmetry of the electrical field with respect to the normal course of travel of the particles, at the edges of the field, but which does not materially affect the symmetry at the center of the field.

The various forms of apparatus above described are suitable for use with materials of various sizes. The separating cells, both in the form illustrated in Figs. 1 to 10 and in the form illustrated in Fig. 14, will handle material varying in size from very fine dust to large sized grains or even, in some cases, particles up to ⅛ inch or more in size. The various forms of electrifiers herein disclosed are likewise capable of handling material of a considerable range of sizes. The gravity type of electrifier, such as illustrated in Fig. 18, gives good results with particles of about 50 mesh size or larger. For smaller particles, say for example of the order of 100 mesh, it is preferable to use some force other than or in addition to gravity in order to attain the proper electrification because there should be an intimate pressing contact between the particle to be electrified and the metallic conductor, and the force of gravity frequently does not produce sufficient contact pressure with small sized particles. Consequently for sizes smaller than about 50 mesh, it is preferred ordinarily to use either the pneumatic electrifier illustrated in Fig. 3 or the centrigual electrifier illustrated in Figs. 14 to 17, inclusive. The pneumatic electrifier in general is less efficient in terms of power consumption than the centrifugal electrifier, but has the advantage of greater simplicity and freedom from moving parts.

Irrespective of the type of electrifier employed, it is preferable that the material, when subjected to the electrifying action, be thoroughly dry, and it is also advantageous in many cases that the material be heated somewhat at the time it is electrified. In the case of the pneumatic electrifier, the air stream used to carry the material should be dry and preferably warm.

The electrification of particles by an intimate wiping contact with a grounded metallic surface, or by impact with such a surface, or both, in accordance with the present invention, is exceedingly satisfactory when the electrified materials are to be subsequently subjected to the action of an electrostatic field, for the reason that the wiping contact or impact produces a more uniform electrification of the particles of any particular kind or class, than can be produced by certain other methods of electrification. For example, electrification may be attained by agitating a considerable mass of the material to be electrified, and although some of the particles of such a mass become well electrified by such agitation, other similar particles of the mass are apt to be improperly electrified, with the result that there may be considerable divergence in the electrification of similar particles which should be similarly electrified. Electrification by contact with or impact upon a conducting surface, on the other hand, while producing electrostatic charges which are in some cases smaller than those produced by agitation, nevertheless attains reasonably uniform electrification of similar particles which should be equally electrified, and thus the contact and impact form of electrification is materially superior to electrification by agitation, wherever the electrified material is to be subjected to an electrostatic field for separation purposes.

The electrification produced in the particles need not be great; in fact, it is preferred that the particles be only slightly electrified, in order that the forces of attraction or repulsion between the particles themselves (as distinguished from the forces between the particles and the electrodes) may be relatively small and may not cause two or more particles to adhere to each other. It can be shown mathematically that $$r^2 = \frac{q}{kx}$$

in which $r$ is the distance by which two particles must be separated from each other as they pass through the electrostatic field in order that one particle may not appreciably affect the path of travel of the other, $q$ is the charge on each particle (assuming that the two particles carry approximately equal electrostatic charges), $k$ is the dielectric constant of the media surrounding the particles (approximately unity in the case of air), and $x$ is the magnitude of the electrostatic field, all expressed in c. g. s. units. In general, if the particles approach more closely than this limiting value of $r$ as given by the above equation, they will, if carrying charges of opposite sign, be attracted to each other and will adhere to each other and fall together if at least one of the particles is a good insulator, thus defeating the object of the separating cell. If both are conductors, they will share their charges and, although they may not adhere, they will thereafter follow substantially the same paths of travel instead of following different paths, and thus again the object of the separating cell will be defeated. Hence it is important, for efficient results, to have the particles separated by a distance at least equal to or preferably greater than the limiting value of $r$ in the above equation.

It is apparent from the equation that $r$ varies directly with the square root of $q$ and inversely with the square root of $x$. Consequently, a lowering of $q$ or the charge carried by the particle, has the effect of lowering $r$, the minimum permissible distance by which the particles must be separated. On the other hand, a raising of $x$, the strength of the electrostatic field, likewise has the effect of lowering $r$. Hence it is seen that if the charges $q$ carried by the particles are made relatively small (but nevertheless large enough so that proper differentiation is attained in the separating cell) and if the strength of the electrostatic field is made relatively large, the minimum permissible distance $r$ between particles can be made very small and thus a greater concentration of particles can be passed through the separating cell, with consequent increase of the capacity of the apparatus.

The strength of the electrostatic field which is most advantageous will depend somewhat upon the average particle size of the material to be treated. The field strength may vary from a voltage gradient of about 1000 volts per centimeter for separating material having an average particle size of about 200 mesh, to a gradient of about 10,000 volts per centimeter for separating material having an average particle size of about 20 mesh. When treating certain placer material, which ordinarily has a size of between 50 mesh and 100 mesh, it is at present preferred to use a potential gradient of 2000 to 3000 volts per centimeter between the electrodes, so that if the electrodes are, for example, at an average distance of about 20 centimeters from each other, the total impressed difference in potential between them, when treating such material, would be preferably about 40,000 to 60,000 volts.

In any event, voltage gradients in excess of about 10,000 volts per centimeter are ordinarily to be avoided, because apparatus of this kind, being particularly valuable for use in mining operations in arid regions where abundant water supplies are not available, should be capable of efficient use even at high altitudes. Voltage gradients materially exceeding 10,000 volts per centimeter are apt to give trouble at high altitudes, where the atmospheric pressure is low, by producing corona, which interferes seriously with the separating action. When used at lower altitudes, however, or where extraordinary precautions are taken against formation of corona, the voltage gradient could be raised somewhat above 10,000 volts per centimeter if desired, though in most cases it is not necessary to do so.

It may be helpful to give examples of the electrification produced, by contact or impact with a conducting surface, in various different materials. The sign (plus or minus) of the electrification produced and also the strength of the electrification, depends on various factors which need not be discussed here except to say that the material to be electrified should in all cases be thoroughly dry and often it is helpful to have it warm. It should then contact with or impact upon the conductor (preferably a grounded conductor) with sufficient pressure to obtain an intimate surface contact over a substantial area of each particle to be electrified. This intimate contact is essential to proper and uniform electrification. When the particles impact forcibly against the conducting surface, or move rapidly over the conducting surface, the tiny microscopic ridges, points, and other irregularities of the particles, are apparently broken off or worn away so that an intimate surface to surface contact between the particles and the conductor is attained, which produces electrification quite independently of the conducting or insulating character of the particles to be electrified, but depending upon and in accordance with the surface properties of the particles.

For example, silica is highly electrified to a negative sign when subjected to this impact or wiping contact process, and calcite is highly electrified to a positive sign under the same conditions. Galena is frequently charged slightly negatively, though some samples show a slight positive charge.

The sign and amount of the charge produced depends to some extent on the character of the material forming the contacts against which the particles are rubbed or against which they impact. In the examples given above, it is assumed that the particles impact upon or are rubbed against brass. If rubbed against other conducting materials, such as iron, or copper, the sign or amount of electrification might be different.

In general it may be said that the strongly alkaline metals and their oxides and carbonates are usually positively charged with respect to commercial sheet metal, such as brass or steel. Sodium, magnesium, and aluminum, for example, usually take a strong positive charge, iron is charged positively but less strongly, while copper, silver, and gold are usually charged slightly positively or in some cases even slightly negatively, depending on the presence of various impurities in these materials. The strongly acidic elements and their oxides are, in general, negatively charged with respect to commercial sheet metals, such as brass or steel. Silicon, which in the form of quartz is the predominating gangue mineral, is strongly charged negatively and thus can usually be separated electrostatically without difficulty from the valuable minerals to be recovered, when the particles are electrified, as disclosed herein, by intimate wiping contact or impact with a grounded conducting surface.

Preliminary experiment with any particular mixture to be separated will readily indicate to those skilled in this art the necessary facts as to the electrification produced in the different materials forming the mixture and the proper setting of the electrodes, also the receiving hoppers, and the separating edges between the hoppers.

The apparatus of the present invention may be used for the recovery of valuable minerals from many kinds of deposits. When used for recovery from lode deposits the ore will, of course, be sufficiently disintegrated or ground up to separate it into individual particles of the valuable mineral to be recovered on the one hand and the gangue on the other hand. When used for recovery of minerals from placer deposits, no grinding or crushing is necessary in many case, because the valuable mineral is in many cases merely mixed mechanically with sand or gravel. Sometimes, however, placer deposits of valuable minerals contain considerable quantities of clay mixed with the sand or gravel, and valuable mineral is frequently in the mass of clay. The present invention, therefore, as a further and important feature, comprehends the excavating of the mixture of clay and gravel or sand in a substantially dry state, and the subsequent disintegration or breaking up of the clay by any suitable means while still in a substantially dry state in order to free, from the clay mass, the mineral and the sand and gravel entrained in the clay. The gravel may then be separated and discarded by any suitable means, such as by dry screening or the like, since the valuable mineral is not, as a rule, found in the gravel pebbles or stones. When the gravel has thus been disintegrated, the remainder of the mixture, which now includes all of the fine or small sized particles, such as sand, clay, and mineral, is heated for the purpose of drying it thoroughly if it is not already thoroughly dried, and is then run through one or another form of electrifier such as above described, and then the electrified mixture is passed between the electrodes and through the electrostatic field of separating apparatus such as above described, to separate the valuable mineral from the gangue. Thus according to the present invention the entire mining process, from the excavation of the mixture to the recovery of the valuable mineral, is carried on in a dry or substantially dry state, so that mining according to the present invention is feasible in arid regions where there is no water supply and where mining heretofore has not been economically possible.

I claim:

1. The method of separating a mixture of particles having different surface electrification properties, which comprises moving the mixture, in the absence of any substantial external electrostatic field, in intimate wiping contact with a conducting surface which is at a potential sufficiently close to ground to avoid substantial interference with the differential electrification to be produced in the particles, thereby causing differential electrification of the particles primarily in accordance with their surface electrification properties, and then moving the particles while still thus electrified through a high potential electrostatic field to cause separation of the differently electrified particles into different groups.

2. The method of separating a mixture of particles having different surface electrification properties, which comprises moving the mixture in a relatively thin layer over a conducting surface in the absence of a substantial external electrostatic field, with the great majority of the particles in direct contact with said surface, to produce differential electrification of the particles in accordance with their surface electrification properties, said conducting surface being at a potential sufficiently close to ground to avoid substantial interference with the electrification to be produced in said particles according to their surface electrification properties by said contact with said surface, and then moving the particles while still thus electrified and without allowing them to bunch into large masses, through a high potential electrostatic field to cause separation of the differently electrified particles into different groups, the electrostatic field having a potential gradient of such magnitude with relation to the shape of adjacent surfaces that substantially no corona is produced.

3. The method of separating according to their surface electrification properties a mixture of particles having different surface electrification properties, which comprises moving the mixture, in the absence of any substantial external electrostatic field, in intimate wiping contact with a conducting surface which is at a potential sufficiently close to ground to avoid substantial interference with the differential electrification to be produced in the particles by such wiping contact, thereby causing differential electrification of the particles at relatively low potential according to their surface electrification properties, and then separating the differently electrified particles from each other by moving them while still thus electrified through an electrostatic field having a potential gradient of the order of magnitude of more than one thousand volts per centimeter and sufficiently high so that the deflecting forces acting upon the electrified particles by virtue of said field are substantially greater than those produced upon the particles by each other.

4. The method of separating according to their surface electrification properties a mixture of materials having different surface electrification properties, which comprises causing the mixture to impinge forcibly, in the absence of any substantial external electrostatic field, against a conducting surface which is at a potential sufficiently close to ground to avoid substantial interference with the differential electrification to be produced in the materials by such forcible impingement, thereby causing differential electrification of the materials primarily in accordance with their surface electrification properties, and then causing the materials while still thus electrified to pass between two electrodes carrying high potential electrostatic charges of opposite sign in a path of travel normally out of contact with both of the electrodes.

5. The method of separating according to their surface electrification properties a mixture of materials having different surface electrification properties, which comprises moving the mixture, in the absence of any substantial external electrostatic field, in intimate frictional contact with a conducting surface which is at a potential sufficiently close to ground to avoid substantial interference with the differential electrification to be produced in the materials by such frictional contact, thereby causing differential electrification of the materials primarily in accordance with their surface electrification properties, and then causing the materials while still thus electrified to pass through a high potential electrostatic field substantially free of corona and substantially symmetrical with respect to the path of travel of the material.

6. The method of separating according to their surface electrification properties a mixture of materials having different surface electrification properties, which comprises causing the mixture to impinge forcibly, in the absence of any substantial external electrostatic field, against a conducting surface which is at a potential sufficiently close to ground to avoid substantial interference with the differential electrification to be produced in the materials by such forcible impingement, thereby causing differential electrification of the materials primarily in accordance with their surface electrification properties, and then causing the materials while still thus electrified to pass through a high potential electrostatic field substantially free of corona and substantially symmetrical with respect to the path of travel of the material.

7. The method of separating according to their surface electrification properties a mixture of particles having different surface electrification properties, which comprises causing the mixture to move, in the absence of any substantial external electrostatic field, in frictional contact with a conducting surface which is at a potential sufficiently close to ground to avoid substantial interference with the electrification to be produced in the particles by such frictional contact, thereby causing differential electrification of the particles primarily in accordance with their surface electrification properties, and then quickly passing the mixture of particles while still thus electrified through a plurality of separate high potential substantially uniform electrostatic fields with sufficient rapidity so that the electrified particles retain a substantial part of their electrostatic charges at least until they reach the last field.

8. The method of separating according to their surface electrification properties a mixture of materials having different surface electrification properties, which comprises propelling said mixture by means of a current of gas into frictional wiping contact, in the absence of any substantial external electrostatic field, with a conducting surface which is at a potential sufficiently close to ground to avoid substantial interference with the differential electrification to be produced in said mixture by said frictional wiping contact, thereby causing differential electrification of the materials primarily in accordance with their surface electrification properties, then substantially separating the gas from the mixture, and then moving the mixture through a high potential electrostatic field while the materials in the mixture are still thus electrified and without allowing said materials to bunch together into masses of substantial size at any time between the electrification thereof and the passage thereof through said field.

9. The method of separating according to their surface electrification properties a mixture of materials having different surface electrification properties, which comprises propelling said mixture by means of centrifugal force into frictional wiping contact, in the absence of any substantial external electrostatic field, with a conducting surface which is at a potential sufficiently close to ground to avoid substantial interference with the differential electrification to be produced in said mixture by said frictional wiping contact, thereby causing differential electrification of the materials primarily in accordance with their surface electrification properties, and then moving the mixture through a high potential electrostatic field while the materials in the mixture are still thus electrified and without allowing said materials to bunch together into masses of substantial size at any time between the electrification thereof and the passage thereof through said field.

10. The method of differentially electrifying finely divided particles in a mixture according to their surface electrification characteristics, which comprises causing the mixture to move in frictional contact with a conducting surface at a potential sufficiently close to ground potential so as to have no substantial detrimental effect on the ability of particles brought into contact therewith to acquire and retain electrostatic charges in accordance with their surface electrification characteristics and in the absence of any substantial external electrostatic field, thereby to cause differential electrification of the different particles primarily in accordance with their surface electrification characteristics and independently of differences in electrical conductivity of the respective particles.

11. Apparatus for separating according to their surface electrification properties a mixture of finely divided solid particles having different surface electrification properties, comprising means forming a conducting surface, means for moving said particles over said surface in intimate frictional wiping contact therewith and in the absence of any substantial external electrostatic field, to cause differential electrification of the different particles primarily in accordance with their surface electrification properties, means for conducting away charges built up on said conducting surface by said frictional wiping contact so as to maintain said surface at a potential sufficiently close to ground to avoid substantial interference with the differential electrification to be produced in the particles, two spaced electrodes each of substantial area carrying high potential electrostatic charges of opposite sign, and means for causing said particles while still electrified primarily in accordance with their surface electrification properties, to move in a path of travel between and normally out of contact with both of said electrodes, so that the electrostatic field set up by said electrodes will deflect said particles from the paths through which they would otherwise travel, in accordance with the charges carried by said particles, to separate differently electrified particles from each other.

12. Apparatus for separating according to their surface electrification properties a mixture of finely divided solid particles having different surface electrification properties, comprising means forming a conducting surface, means for moving said particles over said surface in intimate frictional wiping contact therewith and in the absence of any substantial external electrostatic field, to cause differential electrification of the different particles primarily in accordance with their surface electrification properties, means for conducting away charges built up on said conducting surface by said frictional wiping contact so as to maintain said surface at a potential sufficiently close to ground to avoid substantial interference with the differential electrification to be produced in the particles, two separating units each comprising two spaced electrodes of substantial area carrying high potential electrostatic charges of opposite sign, means for passing substantially all of the particles while still thus electrified between said electrodes of one of said units, and means for subsequently passing a part of the particles between the electrodes of the other separating unit relatively quickly after passage through the first unit and while the particles still retain a substantial part of the electrification produced in them by said frictional wiping contact.

13. Apparatus for separating according to their surface electrification properties a mixture of finely divided solid particles having different surface electrification properties, comprising means forming a conducting surface, means for moving said particles over said surface in intimate frictional wiping contact therewith and in the absence of any substantaial external electrostatic field, to cause differential electrification of the different particles primarily in accordance with their surface electrification properties, means for conducting away charges built up on said conducting surface by said frictional wiping contact so as to maintain said surface at a potential sufficiently close to ground to avoid substantial interference with the differential electrification to be produced in the particles, means for creating a high potential electrostatic field, and centrifugal means for passing said particles while still thus electrified through said electrostatic field so that differently electrified particles will be differently affected by said field and will follow different paths of travel therethrough.

14. Apparatus for electrifying in accordance with their surface electrification properties a mixture of particles having different surface electrification properties, said electrifying apparatus comprising a conducting surface, means for moving said particles over said surface in intimate frictional wiping contact therewith and in the absence of any substantial external electrostatic field, to cause differential electrification of the different particles primarily in accordance with their surface electrification properties, and means for conducting away charges built up on said conducting surface by said frictional wiping contact so as to maintain said surface at a potential sufficiently close to ground to avoid substantial interference with the differential electrification to be produced in the particles.

15. Apparatus for electrifying in accordance with their surface electrification properties a mixture of particles having different surface electrification properties, said electrifying apparatus comprising a conducting surface, means for causing said particles to impact forcibly against said conducting surface and in the absence of any substantial external electrostatic field to cause differential electrification of the different particles primarily in accordance with their surface electrification properties, and means for conducting away charges built up on said conducting surface by said impact so as to maintain said surface at a potential sufficiently close to ground to avoid substantial interference with the differential electrification to be produced in the particles.

16. Apparatus for electrifying in accordance with their surface electrification properties a mixture of particles having different surface electrification properties, said electrifying apparatus comprising an inclined conducting surface, pneumatic means for causing said particles to impact upon said inclined conducting surface and slide downwardly therealong in intimate frictional wiping contact therewith and in the absence of any substantial electrostatic field, to cause differential electrification of the different particles primarily in accordance with their surface electrification properties, and means for conducting away charges built up on said conducting surface by said impact and sliding so as to maintain said surface at a potential sufficiently close to ground to avoid substantial interference with the differential electrification to be produced in the particles.

17. Apparatus for electrifying in accordance with their surface electrification properties a mixture of particles having different surface electrification properties, said electrifying apparatus comprising a cup of conducting material, means for rotating said cup, means for delivering said mixture of particles into said cup so that centrifugal action will force said particles outwardly from the axis of rotation along the inner surface of said cup in frictional wiping contact therewith to cause differential electrification of said particles primarily in accordance with their surface electrification properties, said inner surface of said cup being substantially free of the influence of any substantial external electrostatic field, and means for conducting away charges built up on said inner surface of said cup so as to maintain said surface at a potential sufficiently close to ground to avoid substantial interference with the differential electrification to be produced in the particles.

18. Apparatus for separating according to their surface electrification properties a mixture of finely divided solid particles having different surface electrification properties, comprising means forming a conducting surface, means for moving said particles over said surface in intimate frictional wiping contact therewith and in the absence of any substantial external electrostatic field, to cause differential electrification of the different particles primarily in accordance with their surface electrification properties, spaced conducting means in close proximity to the path of travel of the particles being electrified, so as to increase the capacity of the electrified material to carry a high electrostatic charge without sparking, means for conducting away charges built up on said conducting surface by said frictional wiping contact so as to maintain said surface at a potential sufficiently close to ground to avoid substantial interference with the differential electrification to be produced in the particles, two spaced electrodes each of substantial area carrying high potential electrostatic charges of opposite sign, and means for causing said particles while still electrified primarily in accordance with their surface electrification properties, to move in a path of travel between and normally out of contact with both of said electrodes, so that the electrostatic field set up by said electrodes will deflect said particles from the paths through which they would otherwise travel, in accordance with the charges carried by said particles, to separate differently electrified particles from each other.

19. Electrifying apparatus comprising means forming an upwardly tapered conducting surface substantially free from the influence of an external electrostatic field and having a substantially closed and pointed upper end, and pneumatic means for causing a mixture of particles of different materials having different surface electrification characteristics to impact downwardly upon said pointed upper end and slide downwardly along said surface in intimate wiping contact therewith to become thereby electrified in accordance with their surface electrification characteristics.

20. Apparatus for electrifying in accordance with their surface electrification properties a mixture of particles having different surface electrification properties, said electrifying apparatus comprising a conducting surface, pneumatic means for causing said particles to impact upon said conducting surface in the absence of any substantial external electrostatic field, to cause differential electrification of the different particles primarily in accordance with their surface electrification properties, and means for conducting away charges built up on said conducting surface by said impact of said particles so as to maintain said surface at a potential sufficiently close to ground to avoid substantial interference with the differential electrification to be produced in the particles.

B